Patented June 21, 1949

2,473,872

UNITED STATES PATENT OFFICE 2,473,872

PROCESS OF MANUFACTURING ANTHRA-
QUINONE-C-ARYLTHIAZOLES

Maurice H. Fleysher, Buffalo, N. Y., assignor to
Allied Chemical & Dye Corporation, New York,
N. Y., a corporation of New York No Drawing. Application filed December 7, 1946,
Serial No. 714,895

15 Claims. (Cl. 260—303)

The present invention relates to an improvement in the manufacture of anthraquinone-C-arylthiazoles from aminoanthraquinones by reaction with sulfur and an omega-polyhalogenated arylmethane. It relates especially to an improvement in the manufacture of anthraquinone-1,2,5,6-C-diphenyldithiazole from 2,6-diaminoanthraquinone, sulfur and an omega-polychlorotoluene.

It is known to manufacture anthraquinone-C-arylthiazoles by heating an aminoantharquinone with sulfur and an omega-polyhalogenated arylmethane having the formula

wherein R represents an aromatic nucleus (especially, a mononuclear aromatic nucleus) which may contain further substituents, X and Y stand for halogen atoms, and Z denotes hydrogen or a halogen atom.

Thus it is known to heat a reaction mixture containing an aminoanthraquinone (as for example, 2 - amino-anthraquinone, 2,6 - diamino-anthraquinone or 2,7-diamino-anthraquinone), sulfur, an omega-aryl-methyl polychloride (for example, benzotrichloride, benzal chloride, bromobenzotrichloride, and mixtures thereof) and an inert organic solvent as the reaction medium (as for example, o-dichlorobenzene, naphthalene, diphenyloxide, chloronaphthalene, etc.) at a thiazole-forming temperature.

The reaction requires heating of the reaction mixture for an extended period of time (generally 20 to 30 hours) at an elevated temperature (generally in the neighborhood of 200° C.), and the resulting anthraquinone-C-arylthiazoles are obtained in an impure form and in a low yield.

I have discovered that the reaction is favorably influenced by including in the reaction mixture a minor amount of a carbocyclic hydroxy compound or an omega-halogenated arylmethane condensation product thereof. For example, the yield of anthraquinone-C-arylthiazole is substantially increased, the anthraquinone-C-arylthiazole is produced in a purer form, and the time required to form the anthraquinone-C-arylthiazole is shortened considerably.

Accordingly, in the practice of the present invention, a carbocyclic hydroxy compound or an omega-halogenated arylmethane condensation product thereof is included in a reaction mixture of the above type. It is not known in what way the carbocyclic hydroxy compounds and the omega-halogenated arylmethane condensation products thereof function in bringing about the improved results of the present invention; that is, whether the action is catalytic or otherwise. The invention accordingly is not limited to any theoretical explanation, and where the term "adjuvant" is employed herein in referring to said compounds and condensation products, it is to be understood as not limited to any particular mode of action.

Various carbocyclic hydroxy compounds and omega-halogenated arylmethane condensation products thereof may be employed as adjuvants in accordance with the present invention. Thus the carbocyclic hydroxy compounds may be aromatic or non-aromatic and may contain nuclear substituents besides hydroxyl groups. They include, for example, hydroxy aromatic compounds of the benzene series (mononuclear aromatic carbocyclic hydroxy compounds), of the naphthalene series, and of the biphenyl series, as well as related hydroaromatic compounds having one or more hydroxyl groups. Those which are hydroxy derivatives of carbocyclic hydrocarbons (and especially of aromatic hydrocarbons) having a maximum of two carbon rings, and particularly those which are monohydroxy hydrocarbon derivatives, are preferred for use as adjuvants in accordance with the present invention. The omega-halogenated arylmethane condensation products include the condensation products of the above-mentioned carbocyclic hydroxy compounds with the above-mentioned omega-halogenated arylmethanes having the formula

Specific instances of these adjuvants are: phenol, cresol, cyclohexanol, resorcinol, alpha-naphthol, beta-naphthol, hydroxybiphenyl, and the condensation products of benzotrichloride or benzal chloride with phenol.

Aside from the fact that the use of the adjuvants, in accordance with the present invention, results in a considerable shortening of the reaction period, the conditions under which the reaction is carried out are not required to be modified by the inclusion of the adjuvants in the reaction mixture. Condensation temperatures previously employed in the art are suitable. The reaction is preferably carried out at temperatures of about 200° C. to about 250° C., which temperatures may be conveniently obtained by employing naphthalene or other inert high-boiling solvent. Temperatures substantially lower than 200° C. require a relatively long heating period to complete the reaction. Temperatures substantially higher than 250° C. promote excessive formation of undesired by-products, with consequent deterioration of the yield and quality of anthraquinone-C-arylthiazole.

It is a feature of the present invention that the use of the adjuvants in conjunction with an inert high-boiling solvent as the reaction medium overcomes certain of the disadvantages resulting from the use of such solvents as the reaction medium in the absence of said adjuvants, while at the same time securing the benefits of the use of the said solvents as the reaction medium. Thus, when using naphthalene, which generally leads to a product of better quality and permits higher reaction temperatures than solvents such as o-dichloro benzene, the tendency in certain cases (for example, in the manufacture of anthraquinone-1,2,5,6-C-diphenyldithiazole) is to produce the thiazole in a physical form which interferes with its separation from the reaction mass by filtration and/or its extraction by washing with solvents for subsequent purification. By including in the reaction mixture the adjuvants of the present invention, not only can the reaction be carried out at high reaction temperatures with the production of thiazole of good quality, but the thiazole is obtained in a form which is easily filtered and washed with solvents, as well as in higher yields.

The carbocyclic hydroxy compound or omega-halogenated arylmethane condensation product thereof may be incorporated into the reaction mixture in any convenient manner. For example, the carbocyclic hydroxy compound or omega-halogenated arylmethane condensation product thereof may be mixed with the other components of the reaction mixture and then heated to the reaction temperature; or the aminoanthraquinone, sulfur, omega-polyhalogenated arylmethane, and the inert high-boiling solvent may be mixed and heated, and then the carbocyclic hydroxy compound may be incorporated into the mixture. It is also possible to prepare an omega-halogenated arylmethane condensation product of the carbocyclic hydroxy compound as a preliminary stage of the reaction, and then incorporate the other reaction components into the resulting mixture. For instance, the carbocyclic hydroxy compound and the omega-polyhalogenated arylmethane which is to be reacted with the aminoanthraquinone may be heated with the inert high-boiling solvent to a temperature approaching the final temperature; the sulfur and aminoanthraquinone then may be added; and the resulting mixture then may be heated and maintained at the final reaction temperature. Preferably, the carbocyclic hydroxy compound is added to the reaction mixture before the mixture is heated to the final reaction temperature.

The amount of carbocyclic hydroxy compound or omega-halogenated arylmethane condensation product thereof which is required is not critical and may be varied widely. Ordinarily, the amount employed is at least sufficient to increase the yield of anthraquinone-C-arylthiazole materially (i. e., by at least 5% by weight). The exact amount required for optimum results will vary with the individual reaction mixture and with the individual carbocyclic hydroxy compound. For example, in the case of monohydroxy derivatives of aromatic hydrocarbons having a maximum of two carbon rings, an amount thereof equal to about 5% to about 60% of the weight of the aminoanthraquinone produces a high yield of anthraquinone-C-arylthiazole. Considerably lesser amounts than about 5% of the weight of the aminoanthraquinone may be employed, but the advantages resulting from the use of the adjuvant are reduced somewhat. Greater amounts than about 60% of the weight of the anminoanthraquinone also may be employed, if desired, but without providing a substantially increased benefit. In the case of polyhydric phenols (as, for example, resorcinol) smaller amounts are preferably employed, owing to their greater reactivity, and the reaction mixture is preferably heated gradually to the reaction temperature.

The following examples illustrate the invention. The parts are by weight, and temperatures are in degrees centigrade.

*Example 1*

Part A.—A mixture of 35 parts of technical grade 2,6-diamino-anthraquinone, 35 parts of sulfur, 150 parts of benzotrichloride, 15 parts of phenol and 140 parts of naphthalene is heated to boiling (220° to 225°) and refluxed for 12 hours. The reaction mass is then cooled to 185°, diluted with 195 parts of o-dichlorobenzene, and filtered. The filter-cake is washed with warm o-dichlorobenzene to remove adhering naphthalene, then cooled and washed with denatured alcohol (Formula 2B) to displace the o-dichlorobenzene, and dried. A yield of 49 parts of crude dyestuff is obtained, corresponding to 70% of the theoretical yield of anthraquinone-1,2,5,6 - C-diphenyldithiazole, based on the weight of 2,6-diamino-anthraquinone employed. The dyestuff thus obtained is sufficiently pure for commercial use (for example, in the manufacture of a finished dyestuff paste) without further purification. If desired, it can be further purified in the conventional manner by acid-pasting the crude dyestuff and treating the acid-pasted product with hypochlorite; for example, by dissolving the crude dyestuff in concentrated sulfuric acid, pouring the solution into a relatively large quantity of water, filtering, and treating an aqueous suspension of the resulting filter-cake with sodium hypochlorite.

Part B.—The procedure of part A of this example is repeated, but the phenol is omitted. A yield of 40 parts of crude dyestuff is obtained, corresponding to less than 58% of the theoretical yield of anthraquinone - 1,2,5,6-diphenyldithiazole. The crude dyestuff is contaminated to such a degree that it cannot be used commercially without purification.

*Examples 2 to 8*

A number of mixtures, each containing benzotrichloride, 35 parts of 2,6-diamino-anthraquinone (technical grade), 35 parts of sulfur, 140 parts of naphthalene, and one of a number of carbocyclic hydroxy compounds, are heated under refluxing conditions for 12 hours. The various carbocyclic hydroxy compounds and other varying conditions of the process are set out in the following table. The resulting reaction masses are further treated for recovery of the products in the manner set out in Example 1, part A. The yields of crude anthraquinone-1,2,5,6-C-diphenyldithiazole, and the corresponding percent of the theoretical yield, based on the weight of 2,6-diaminoanthraquinone employed, are also set out in the following table:

Table

| Example No. | Carbocyclic Hydroxy Compound | | Benzotrichloride, Parts | Temperature of Reflux, °C. | Yield | |
|---|---|---|---|---|---|---|
| | Type | Parts | | | Parts Crude | Percent |
| 2 | Phenol | 5 | 150 | 220-30 | 50.5 | 72.4 |
| 3 | do | 10 | 150 | 220-25 | 48 | 69 |
| 4 | do | 20 | 175 | 220-25 | 47 | 67.4 |
| 5 | β-Naphthol | 20 | 160 | 230-35 | 50 | 71.8 |
| 6 | α-Naphthol | 15 | 150 | 220-25 | 47 | 67.4 |
| 7 | p-Hydroxy-biphenyl | 15 | 150 | 220-25 | 51 | 73.3 |
| 8 | Cyclo-hexanol | 15 | 150 | 220-25 | 46.5 | 66.7 |

As in the case of the dyestuff produced in Example 1, part A, the crude dyestuffs thus obtained are sufficiently pure for commercial use without further purification.

*Example 9*

A mixture of 140 parts of naphthalene, 150 parts of benzotrichloride and 10 parts of phenol is heated to 200° and held at that temperature for about a quarter hour. As the mass is heated, a reaction takes place, evidenced by a marked change of color in the mass and evolution of hydrogen chloride, the mass being a yellowish-brown liquid at 150°. The mixture is cooled to about 100°, and at this stage, 35 parts of sulfur and 35 parts of 2,6-diamino-anthraquinone are added. The mass is then heated to between 220° and 225°, maintained there for 13 to 14 hours, and then diluted with 195 parts of o-dichlorobenzene. The diluted mass is cooled to 150° and filtered (filtration is rapid), and the filter-cake is washed with 195 parts of o-dichlorobenzene and then with 50 to 100 parts of benzene. The dry product is a commercially pure form of anthraquinone-1,2,5,6-C-diphenyldithiazole, similar in quality and appearance to the crude product of Example 1, part A. The yield of dyestuff is 48 parts, corresponding to 69% of the theoretical yield, based on the weight of 2,6-diamino-anthraquinone employed.

*Example 10*

A mixture of 280 parts of naphthalene, 70 parts of 2,6-diamino-anthraquinone and 70 parts of sulfur powder is heated until it is completely molten. 300 parts of benzotrichloride and 3.5 parts of phenol are then added, and the whole mixture is heated and refluxed at 220° to 225° for 13 to 14 hours. The mass is then diluted with 390 parts of o-dichlorobenzene, cooled to 160°, and filtered. The filter-cake is washed with 390 parts of o-dichlorobenzene, thereafter with about 100 parts of benzene, and finally dried. The dry product is a commercially pure form of anthraquinone-1,2,5,6-C-diphenyldithiazole substantially equal in quality to the product of Example 1, part A. The yield of dyestuff is 92 parts, corresponding to 66% of the theoretical yield, based on the weight of 2,6-diamino-anthraquinone charged.

It will be realized by those skilled in the art that the invention is not limited to the details of the foregoing examples and that changes can be made without departing from the scope of the invention.

Thus, instead of the 2,6-diamino-anthraquinone employed in the above examples, equivalent amounts of other aminoanthraquinones may be substituted; as, for example, 2-amino-anthraquinone or 2,7-diamino-anthraquinone. Further, other omega-polyhalogenated arylmethanes, and especially omega-polyhalogenated mononuclear arylmethanes, may be substituted in equivalent amounts for the benzotrichloride employed in the above examples; as, for example, benzal chloride, a mixture of benzal chloride and benzotrochloride, 2,4-dicloro-benzotrichloride, and bromo-benzotrichlorides.

The naphthalene employed as the reaction medium in the above examples may be replaced by other inert organic solvents (as, for example, o-dichlorobenzene, trichlorobenzene, diphenyl oxide, chloronaphthalene, etc.). Naphthalene is preferably employed inasmuch as excellent results follow from its use in accordance with the present invention, especially in connection with the use of a phenol as the carbocyclic hydroxy compound.

I claim:

1. In the process of producing an anthraquinone C-arylthiazole which comprises heating a reaction mixture containing an aminoanthraquinone, sulfur, an omega-polyhalogenated arylmethane and an inert organic solvent as the reaction medium, the improvement which comprises including in the reaction mixture a member of the group consisting of carbocyclic hydroxy compounds and omega-halogenated aryl methane condensation products thereof.

2. In the process of producing an anthraquinone C-arylthiazole which comprises heating a reaction mixture containing an aminoanthraquinone, sulfur, an omega-polyhalogenated arylmethane and an inert organic solvent as the reaction medium, the improvement which comprises including in the reaction mixture a hydroxy aromatic hydrocarbon.

3. In the process of producing an anthraquinone C-arylthiazole which comprises heating a reaction mixture containing an aminoanthraquinone, sulfur, an omega-polyhalogenated mononuclear arylmethane and an inert organic solvent as the reaction medium, the improvement which comprises including in the reaction mixture an amount of a phenol equal to about 5% to about 60% of the weight of the aminoanthraquinone.

4. In the process of producing an anthraquinone C-arylthiazole which comprises heating a reaction mixture containing an aminoanthraquinone, sulfur, an omega-polychlorotoluene and an inert organic solvent as the reaction medium, the improvement which comprises including in the reaction mixture a hydroxy carbocyclic hydrocarbon having a maximum of two carbon rings, in an amount at least sufficient materially to increase the yield of anthraquinone C-arylthiazole.

5. In the process of producing an anthraquinone C-arylthiazole which comprises heating a reaction mixture containing an aminoanthraquinone, sulfur, an omega-polychlorotoluene and an inert organic solvent as the reaction medium, the improvement which comprises including in the reaction mixture a hydroxy aromatic hydrocarbon in an amount at least sufficient materially to increase the yield of anthraquinone C-arylthiazole.

6. In the process of producing an anthraquinone C-arylthiazole which comprises heating a reaction mixture containing an aminoanthraquinone, sulfur, an omega-polychlorotoluene and an inert organic solvent as the reaction medium, the improvement which comprises including in the reaction mixture a monohydroxy aromatic hydrocarbon having a maximum of two carbon rings, in an amount equal to about 5% to about 60% of the weight of the aminoanthraquinone.

7. In the process of producing an anthraquinone C-arylthiazole which comprises heating a reaction mixture containing an aminoanthraquinone, sulfur, an omega-polychlorotoluene and an inert organic solvent as the reaction medium, the improvement which comprises including in the reaction mixture an amount of phenol equal to about 5% to about 60% of the weight of the aminoanthraquinone.

8. In the process of producing anthraquinone-1,2,5,6 - C - diphenyldithiazole which comprises heating a reaction mixture containing 2,6-diamino-anthraquinone, sulfur, an omega-polychlorotoluene, and an inert organic solvent as the reaction medium, the improvement which comprises including in the reaction mixture a member of the group consisting of carbocyclic hydroxy compounds and omega-halogenated aryl methane condensation products thereof in an amount at least sufficient materially to increase the yield of anthraquinone-1,2,5,6-C-diphenyldithiazole.

9. In the process of producing anthraquinone-1,2,5,6 - C - diphenyldithiazole which comprises heating a reaction mixture containing 2,6-diamino-anthraquinone, sulfur, an omega-polychlorotoluene, and an inert organic solvent as the reaction medium, the improvement which comprises including in the reaction mixture a hydroxy aromatic hydrocarbon in an amount at least sufficient materially to increase the yield of anthraquinone-1,2,5,6-C-diphenyldithiazole.

10. In the process of producing anthraquinone-1,2,5,6 - C - diphenyldithiazole which comprises heating a reaction mixture containing 2,6-diamino-anthraquinone, sulfur, an omega-polychlorotoluene, and an inert organic solvent as the reaction medium, the improvement which comprises including in the reaction mixture a monohydroxy carbocyclic hydrocarbon having a maximum of two carbon rings, in an amount equal to about 5% to about 60% of the weight of the 2,6-diamino-anthraquinone.

11. A process of producing anthraquinone-1,2,5,6 - C - diphenyldithiazole which comprises heating and refluxing a reaction mixture containing 2,6-diamino-anthraquinone, sulfur, an omega-polychlorotoluene, an inert organic solvent as the reaction medium, and a monohydroxy mononuclear aromatic hydrocarbon in an amount equal to about 5% to about 60% of the weight of the 2,6-diamino-anthraquinone.

12. A process of producing anthraquinone-1,2,5,6 - C - diphenyldithiazole which comprises heating and refluxing a reaction mixture containing 2,6-diamino-anthraquinone, sulfur, an omega-polychlorotoluene, an inert organic solvent as the reaction medium, and an amount of phenol equal to about 5% to about 60% of the weight of the 2,6-diamino-anthraquinone.

13. A process of producing anthraquinone-1,2,5,6 - C - diphenyldithiazole which comprises heating and refluxing a reaction mixture containing 2,6-diamino-anthraquinone, sulfur, an omega-polychlorotoluene, naphthalene as the reaction medium, and a hydroxy aromatic hydrocarbon in an amount at least sufficient materially to increase the yield of anthraquinone-1,2,5,6-C-diphenyldithiazole.

14. A process of producing anthraquinone-1,2,5,6 - C - diphenyldithiazole which comprises heating and refluxing a reaction mixture containing 2,6-diamino-anthraquinone, sulfur, an omega-polychlorotoluene, naphthalene as the reaction medium, and a phenol in an amount equal to about 5% to about 60% of the weight of the 2,6-diamino-anthraquinone.

15. A process of producing anthraquinone-1,2,5,6 - C - diphenyldithiazole which comprises heating and refluxing a reaction mixture containing 2,6 - diamino - anthraquinone, sulfur, an omega-polychlorotoluene, naphthalene as the reaction medium, and an amount of phenol equal to about 5% to about 60% of the weight of the 2,6-diamino-anthraquinone.

MAURICE H. FLEYSHER.

No references cited.